(12) United States Patent
Huang

(10) Patent No.: US 10,385,906 B2
(45) Date of Patent: Aug. 20, 2019

(54) QUICK CONNECT NUT

(71) Applicant: Chun-Po Huang, Chunghua (TW)

(72) Inventor: Chun-Po Huang, Chunghua (TW)

( * ) Notice: Subject to any disclaimer, the term of this patent is extended or adjusted under 35 U.S.C. 154(b) by 170 days.

(21) Appl. No.: 15/805,536

(22) Filed: Nov. 7, 2017

(65) Prior Publication Data

US 2019/0136901 A1 May 9, 2019

(51) Int. Cl.
*F16B 37/08* (2006.01)

(52) U.S. Cl.
CPC .......... *F16B 37/0821* (2013.01); *F16B 37/08* (2013.01)

(58) Field of Classification Search
CPC .. F16B 37/00; F16B 37/0821; F16B 37/0842; F16B 37/0857; F16B 37/0864; F16B 37/0885; F16B 37/14; Y10A 411/917
USPC .......................................... 411/429, 432, 433
See application file for complete search history.

(56) References Cited

U.S. PATENT DOCUMENTS

| | | | | |
|---|---|---|---|---|
| 1,366,884 A * | 1/1921 | Nahrung | ............. | F16B 37/0885 411/432 |
| 1,510,492 A * | 10/1924 | Caron | .................. | F16B 37/0885 137/231 |
| 1,861,846 A * | 6/1932 | Dymock | ................. | B60C 29/06 411/432 |
| 2,257,327 A * | 9/1941 | Bradford | ............. | F16B 37/0821 411/433 |
| 2,664,023 A * | 12/1953 | Mugford | ............. | F16B 37/0885 411/433 |
| 4,462,731 A * | 7/1984 | Rovinsky | ............ | F16B 37/0892 269/173 |
| 5,000,640 A * | 3/1991 | Haas, Jr. | ............. | F16B 23/0061 411/409 |
| 5,226,678 A * | 7/1993 | Petranto | .............. | F16L 19/0231 285/334.5 |
| 6,302,446 B1 * | 10/2001 | Spears | ................ | F16L 19/0231 285/33 |
| 8,540,471 B2 * | 9/2013 | Dvorak | ............... | F16B 37/0821 411/433 |
| 8,794,892 B1 * | 8/2014 | Doyle | .................. | F16B 37/0892 411/431 |
| 2010/0158635 A1 * | 6/2010 | Rodman | ............. | F16B 37/0864 411/432 |

* cited by examiner

*Primary Examiner* — Roberta S Delisle

(57) ABSTRACT

A quick connect nut contains: a body including a first locking part, a second locking part, and a flexible C-shaped retainer. The first locking part includes a first forcing face, a first tilted face, a first peripheral groove, a first semicircular orifice having first inner threads, at least one first protrusion, and at least one first arcuate notch. The second locking part includes a second forcing face, a second tilted face, a second peripheral groove, a second semicircular orifice having second inner threads, at least one second protrusion, at least one second arcuate notch, and a second through hole. When the first and second locking parts lock together, an angle is defined between the first and second tilted faces so that a width of an expanding opening between the first and second locking parts is more than an outer diameter of the threaded rod.

9 Claims, 10 Drawing Sheets

QUICK CONNECT NUT

FIELD OF THE INVENTION

The present invention relates to a quick connect nut which is moved to a threaded rod so as to connect with or remove from the threaded rod quickly.

BACKGROUND OF THE INVENTION

A conventional screw nut contains a threaded orifice for screwing with a screw bolt or a threaded rod. As unscrewing the screw nut from the screw bolt or the threaded rod, the screw nut is rotated clockwise or counterclockwise, thus having troublesome operation.

The present invention has arisen to mitigate and/or obviate the afore-described disadvantages.

SUMMARY OF THE INVENTION

The primary aspect of the present invention is to provide a quick connect nut which is moved to a threaded rod so as to connect with or remove from the threaded rod quickly.

To obtain above-mentioned aspect, a quick connect nut provided by the present invention contains: a body connecting with and removing from a threaded rod.

The body including: a first locking part, a second locking part, and a flexible C-shaped retainer.

The first locking part includes a first forcing face formed on a first end of the first locking part, a first tilted face formed on a second end of the first locking part, a first peripheral groove defined on an arcuately outer wall of the first locking part and communicating with the first tilted face, and a first semicircular orifice defined on an arcuately inner wall of the first locking part. The first semicircular orifice has first inner threads formed therein, the first locking part further includes at least one first protrusion formed in a circle shape and located adjacent to the first tilted face, and the first locking part further includes at least one first arcuate notch spaced by the at least one first protrusion.

The second locking part includes a second forcing face formed on a first end of the second locking part, a second tilted face formed on a second end of the second locking part, a second peripheral groove defined on an arcuately outer wall of the second locking part and communicating with the second tilted face, and a second semicircular orifice defined on an arcuately inner wall of the second locking part. The second semicircular orifice has second inner threads formed therein, the second locking part further includes at least one second protrusion formed in a circle shape and located adjacent to the second tilted face, wherein the at least one second protrusion rotatably retains in the at least one first arcuate notch, and the second locking part further includes at least one second arcuate notch spaced by the at least one second protrusion and accommodating the at least one first protrusion, hence the first locking part and the second locking part lock with or release from each other.

When the first locking part locks with the second locking part, a width of an expanding opening between the first locking part and the second locking part is more than an outer diameter of the threaded rod.

The second locking part further includes a second through hole formed thereon, hence a clamping tool C is inserted into the first through hole and the second through hole so as to drive the first locking part and the second locking part to expand outwardly; and The flexible C-shaped retainer is retained in the first peripheral groove and the second peripheral groove so as to lock the first locking part with the second locking part.

DETAILED DESCRIPTION OF THE PREFERRED EMBODIMENTS

Figure 1:
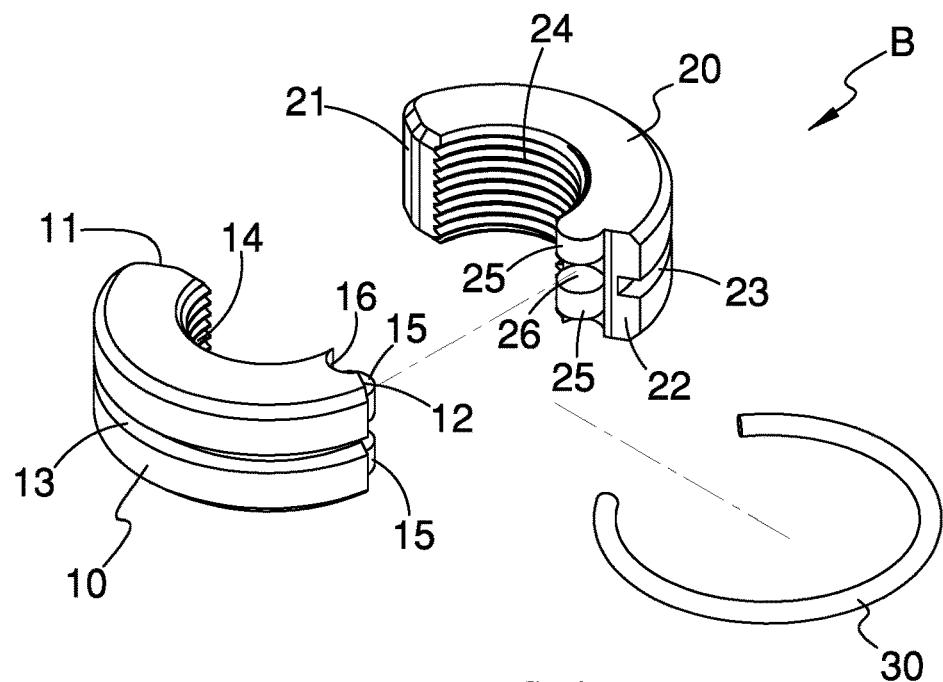
FIG. 1 is a perspective view showing the exploded components of a quick connect nut according to a first embodiment of the present invention.
Figure 2:
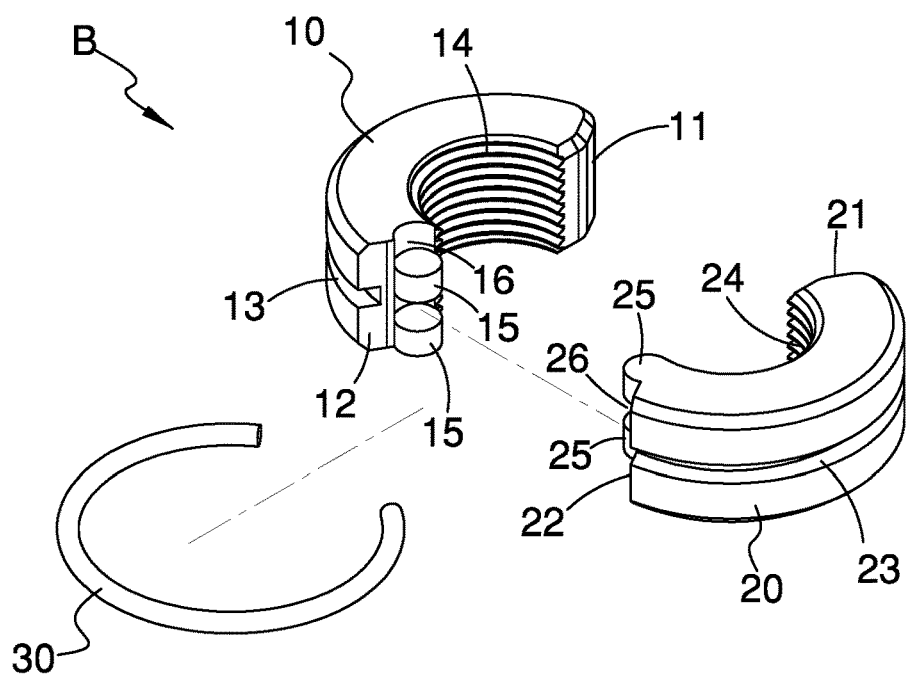
FIG. 2 is another perspective view showing the exploded components of the quick connect nut according to the first embodiment of the present invention.
Figure 3:
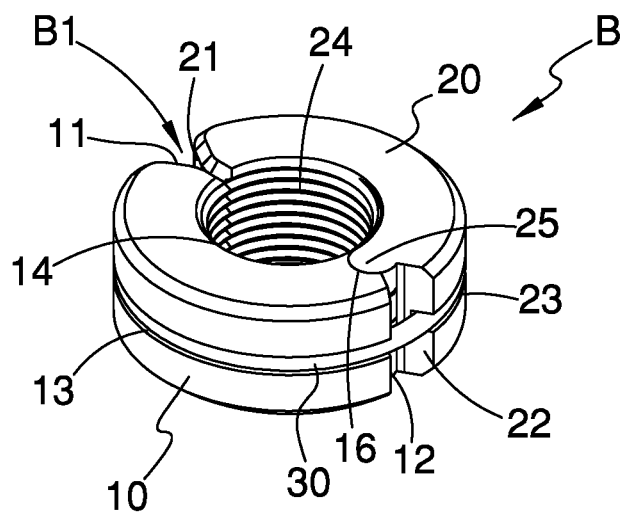
FIG. 3 is a perspective view showing the assembly of the quick connect nut according to the first embodiment of the present invention.
Figure 4:
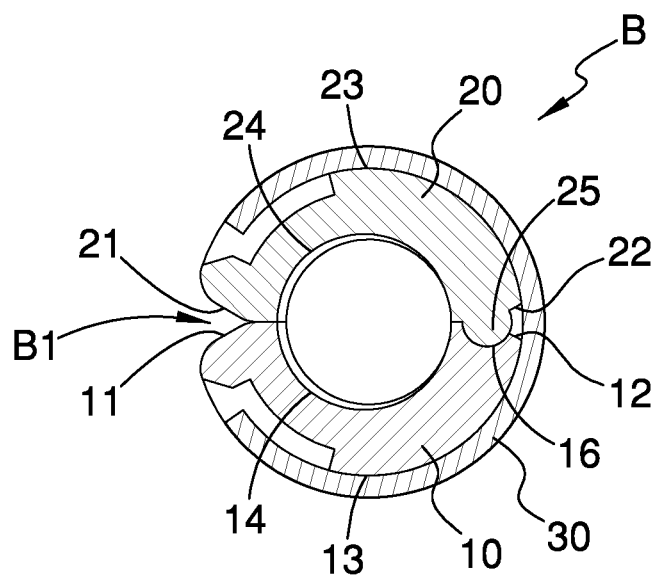
FIG. 4 is a cross sectional view showing the assembly of the quick connect nut according to the first embodiment of the present invention.

With reference to FIGS. 1-6, a quick connect nut according to a first embodiment of the present invention comprises: a body B connecting with and removing from a threaded rod A, and the body B including a first locking part 10, a second locking part 20, and a flexible C-shaped retainer 30.

The first locking part 10 is semicircular, and the first locking part 10 includes a first forcing face 11 formed on a first end of the first locking part 10, a first tilted face 12 formed on a second end of the first locking part 10, a first peripheral groove 13 defined on an arcuately outer wall of the first locking part 10 and communicating with the first tilted face 12 and a first semicircular orifice 14 defined on an arcuately inner wall of the first locking part 10, wherein the first semicircular orifice 14 has first inner threads formed therein. The first locking part 10 further includes at least one first protrusion 15 formed in a circle shape and located adjacent to the first tilted face 12, and the first locking part 10 further includes at least one first arcuate notch 16 spaced by the at least one first protrusion 15.

The second locking part 20 is semicircular, and the second locking part 20 includes a second forcing face 21 formed on a first end of the second locking part 20, a second tilted face 22 formed on a second end of the second locking part 20, a second peripheral groove 23 defined on an arcuately outer wall of the second locking part 20 and communicating with the second tilted face 22, and a second semicircular orifice 24 defined on an arcuately inner wall of the second locking part 20, wherein the second semicircular orifice 24 has second inner threads formed therein. The second locking part 20 further includes at least one second protrusion 25 formed in a circle shape and located adjacent to the second tilted face 22, wherein the at least one second protrusion 25 rotatably retains in the at least one first arcuate notch 16, and the second locking part 20 further includes at least one second arcuate notch 26 spaced by the at least one second protrusion 25 and accommodating the at least one first protrusion 15, hence the first locking part 10 and the second locking part 20 lock with or release from each other.

When the first locking part 10 locks with the second locking part 20 to form the body B in a circle shape, the first semicircular orifice 14 connects with the second semicircular orifice 24 in a circle shape, the first forcing face 11 and the second forcing face 21 couples together so as to define a cutout B1, and an angle is defined between the first tilted face 12 and the second tilted face 22 so that a width of an expanding opening between the first locking part 10 and the second locking part 20 is more than an outer diameter of the threaded rod A, wherein the angle is within 50 degrees to 90 degrees. The first forcing face 11 and the second forcing face 21 are oblique, stepped or arcuate. A number of each of the at least one first protrusion 15, the at least one first arcuate notch 16, the at least one second protrusion 25, and the at least one second arcuate notch 26 is one, two or more than two.

The flexible C-shaped retainer 30 retains in the first peripheral groove 13 and the second peripheral groove 23 so as to lock the first locking part 10 with the second locking part 20. The flexible C-shaped retainer 30 is a curved C-shaped steel ring.

Accordingly, the first locking part 10 and the second locking part 20 are made by a same mold so as to reduce manufacture cost.

Figure 5:
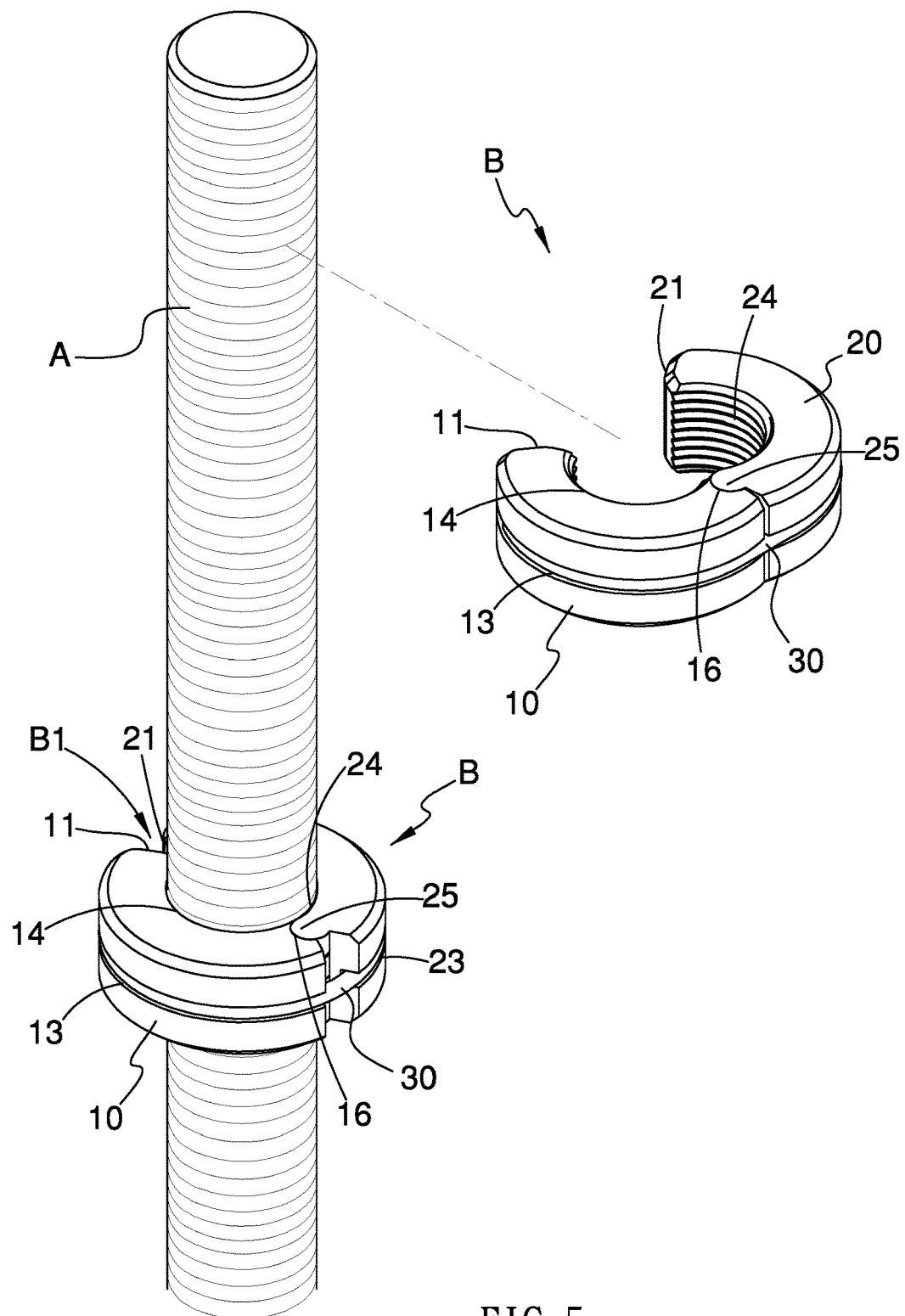
FIG. 5 is a perspective view showing the application of the quick connect nut according to the first embodiment of the present invention.
Figure 6:
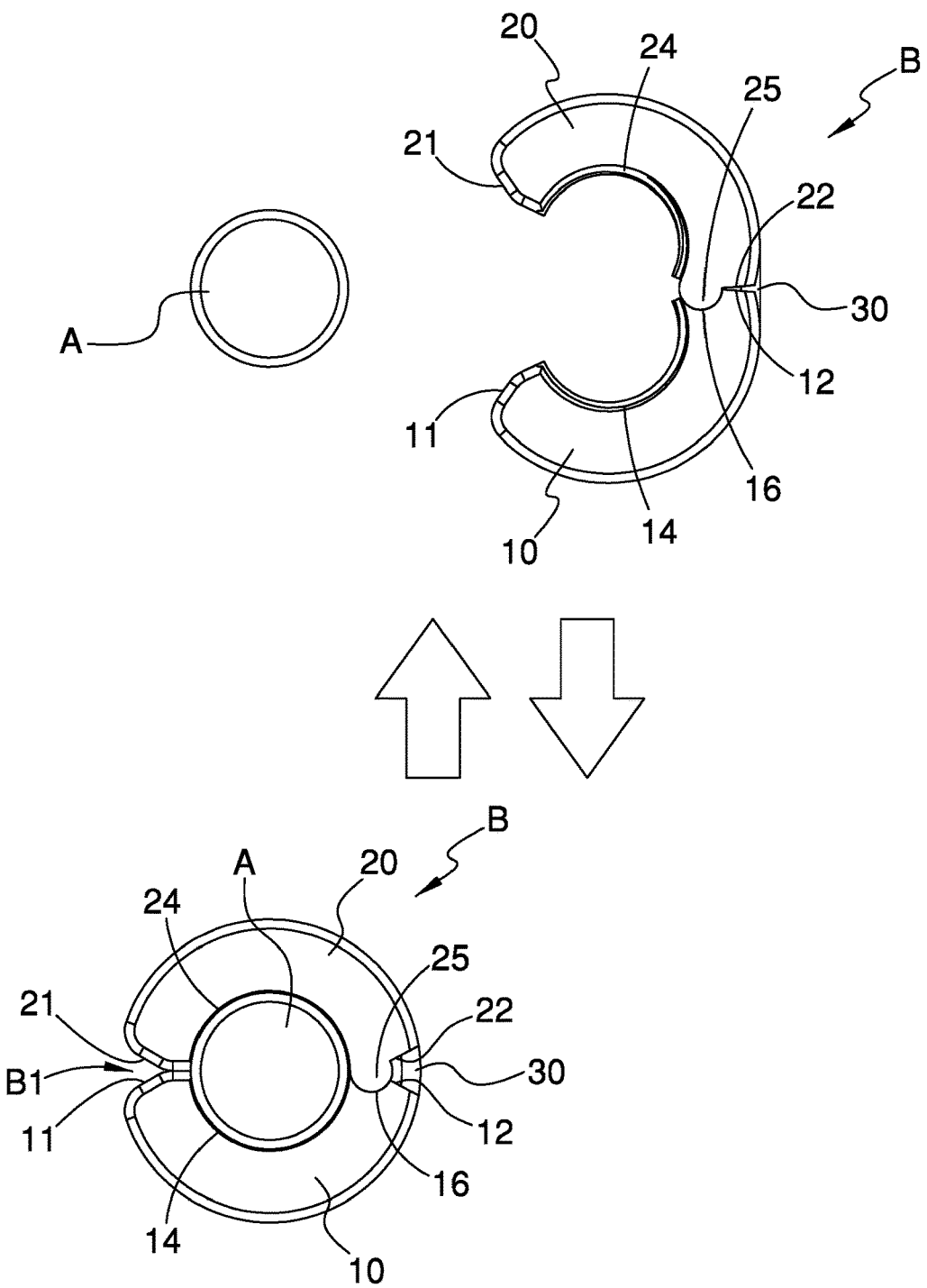
FIG. 6 is a top plan view showing the operation of the quick connect nut according to the first embodiment of the present invention.

As shown in FIGS. 5 and 6, the first locking part 10 and the second locking part 20 are expanded outwardly by pulling the first forcing face 11 and the second forcing face 21 outward, such that the flexible C-shaped retainer 30 is forced outwardly by the first locking part 10 and the second locking part 20, and the first inner threads of the first semicircular orifice 14 and the second inner threads of the second semicircular orifice 24 move a distance away from the threaded rod A so as to move the body B toward a locking position quickly. After releasing the first forcing face 11 and the second forcing face 21, the flexible C-shaped retainer 30 forces the first locking part 10 and the second locking part 20 to clamp the threaded rod A so that the first inner threads of the first semicircular orifice 14 and the second inner threads of the second semicircular orifice 24 screw with outer threads of the threaded rod A. After pulling the first forcing face 11 and the second forcing face 21 outwardly so that the width of the expanding opening between the first locking part 10 and the second locking part 20 is more than the outer diameter of the threaded rod A, the first locking part 10 and the second locking part 20 are removed from the threaded rod A quickly. When the first forcing face 11 and the second forcing face 21 are oblique, the cutout B1 is close to the threaded rod A, and the body B is pushed toward the threaded rod. A so that the first locking part 10 and the second locking part 20 expand outward quickly.

Thereby, the first locking part 10 and the second locking part 20 clamp or remove from the threaded rod A quickly by pulling the first locking part 10 and the second locking part 20 outward and by using the flexible C-shaped retainer 30. Preferably, the first inner threads of the first semicircular orifice 14 and the second inner threads of the second semicircular orifice 24 screw with the outer threads of the threaded rod A securely.

Preferably, the first locking part 10 and the second locking part 20 are made by the same mold so as to reduce manufacture cost.

Figure 7:
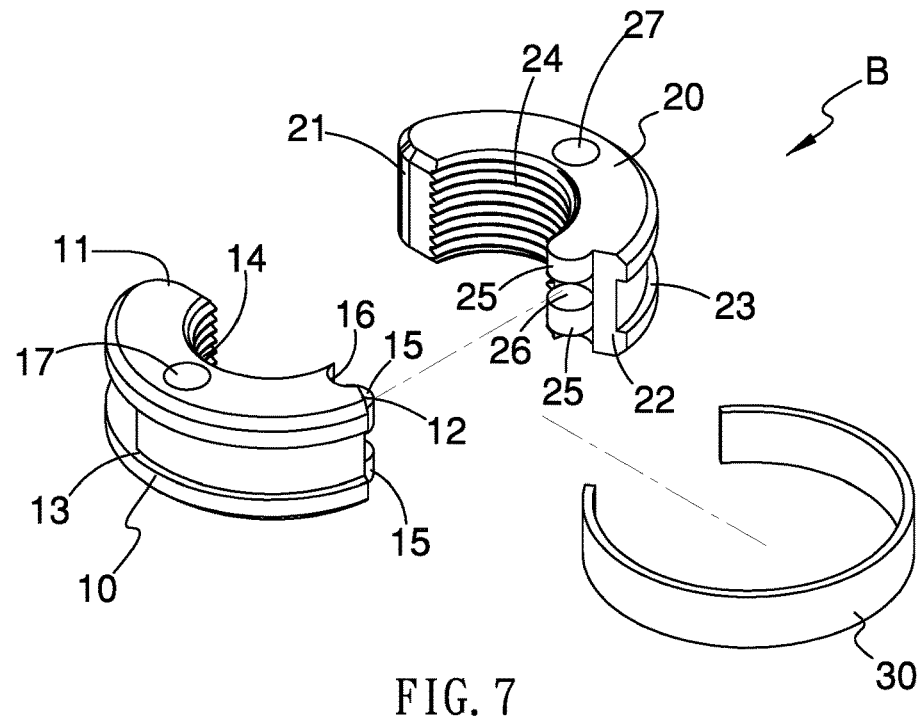
FIG. 7 is a perspective view showing the exploded components of a quick connect nut according to a second embodiment of the present invention.
Figure 9:
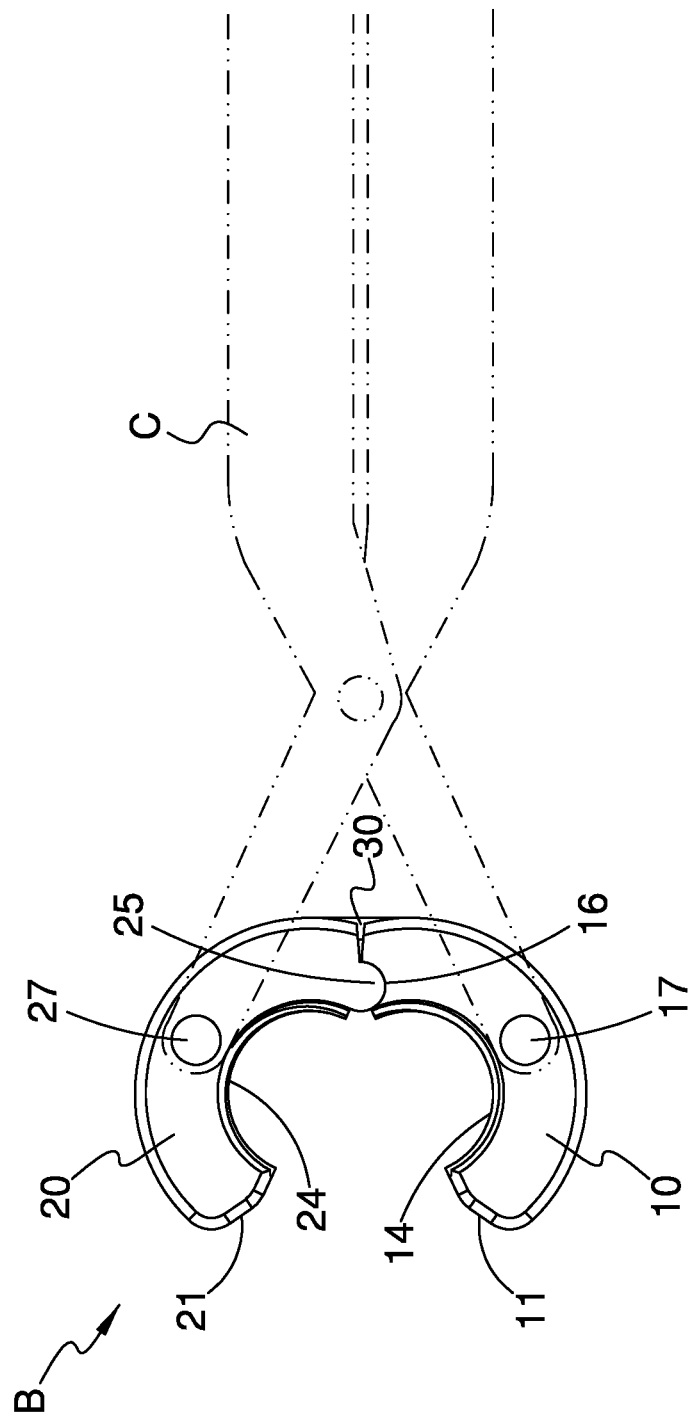
FIG. 9 is a top plan view showing the operation of the quick connect nut according to the second embodiment of the present invention.
Figure 10:
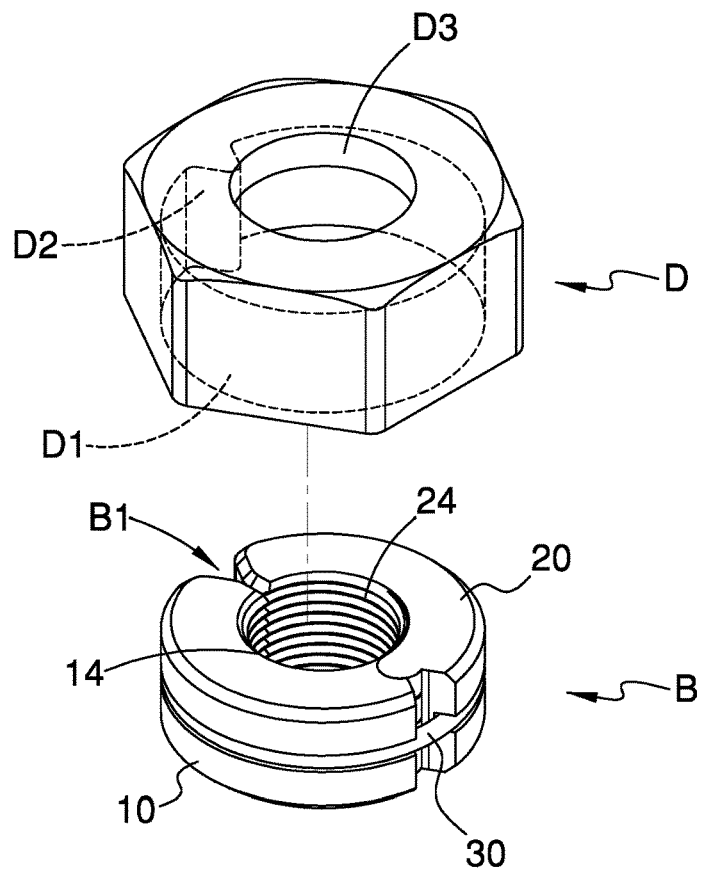
FIG. 10 is a perspective view showing the exploded components of a quick connect nut according to a fourth embodiment of the present invention.
Figure 11:
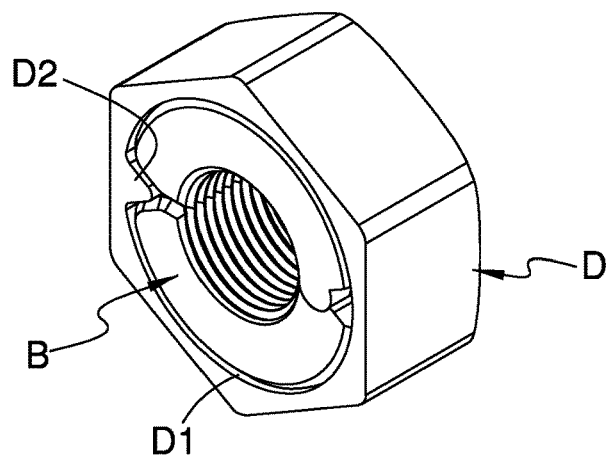
FIG. 11 is a perspective view showing the assembly of the quick connect nut according to the fourth embodiment of the present invention.
Figure 12:
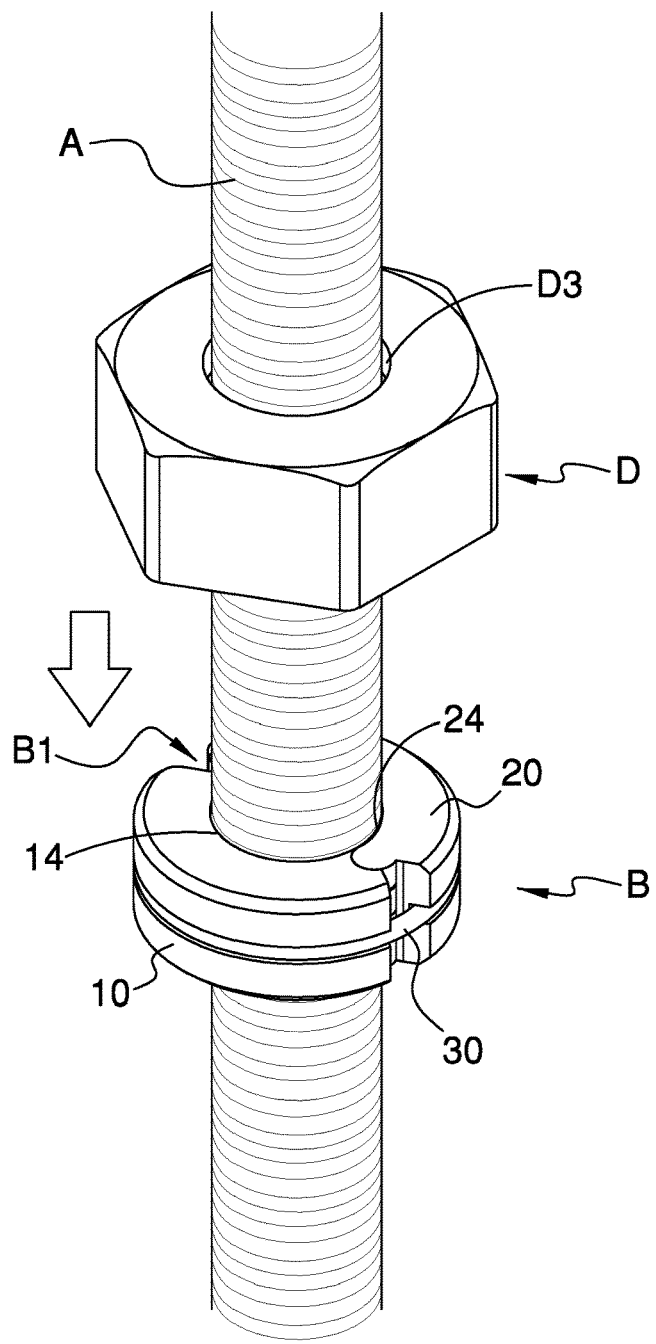
FIG. 12 is a perspective view showing the application of the quick connect nut according to the fourth embodiment of the present invention.
Figure 13:
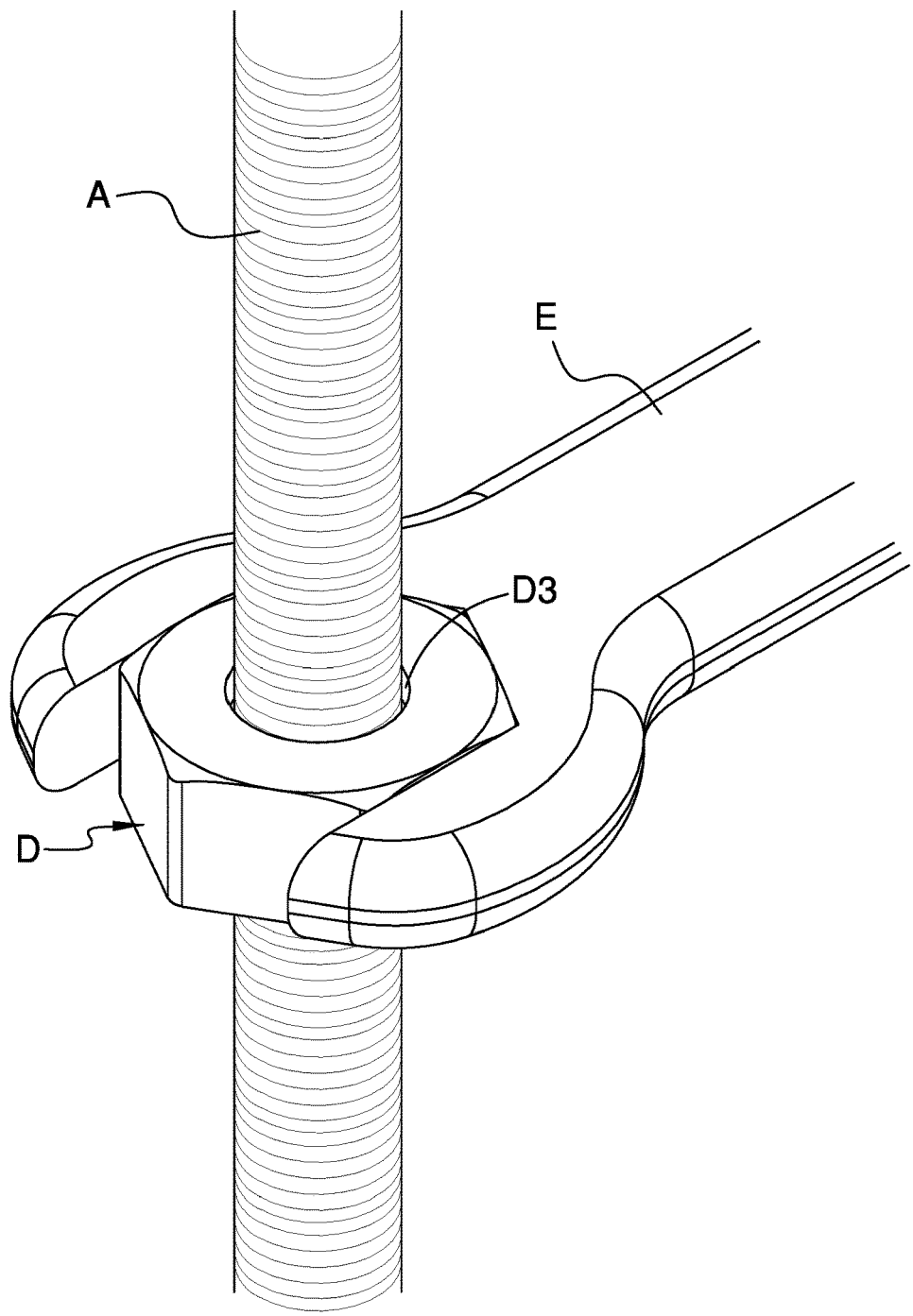
FIG. 13 is another perspective view showing the application of the quick connect nut according to the fourth embodiment of the present invention.
Figure 14:
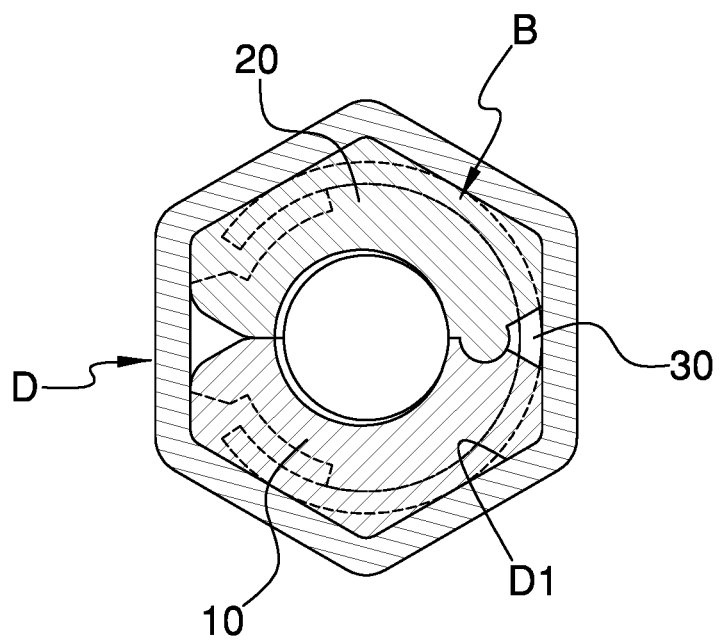
FIG. 14 is a cross sectional view showing the assembly of the quick connect nut according to a fifth embodiment of the present invention.

Referring to FIG. 7, a difference of a quick connect nut of a second embodiment from that of the first embodiment comprises: a width of each of a first peripheral groove 13 and a second peripheral groove 23 is more than that of the first embodiment, and a flexible C-shaped retainer 30 is a curved C-shaped steel sheet. A first locking part 10 has a first through hole 17 defined thereon, and a second locking part 20 further includes a second through hole 27 formed thereon, hence a clamping tool C is inserted into the first through hole 17 and the second through hole 27 so as to drive the first locking part 10 and the second locking part 20 to expand outwardly, as illustrated in FIG. 9.

Figure 8:
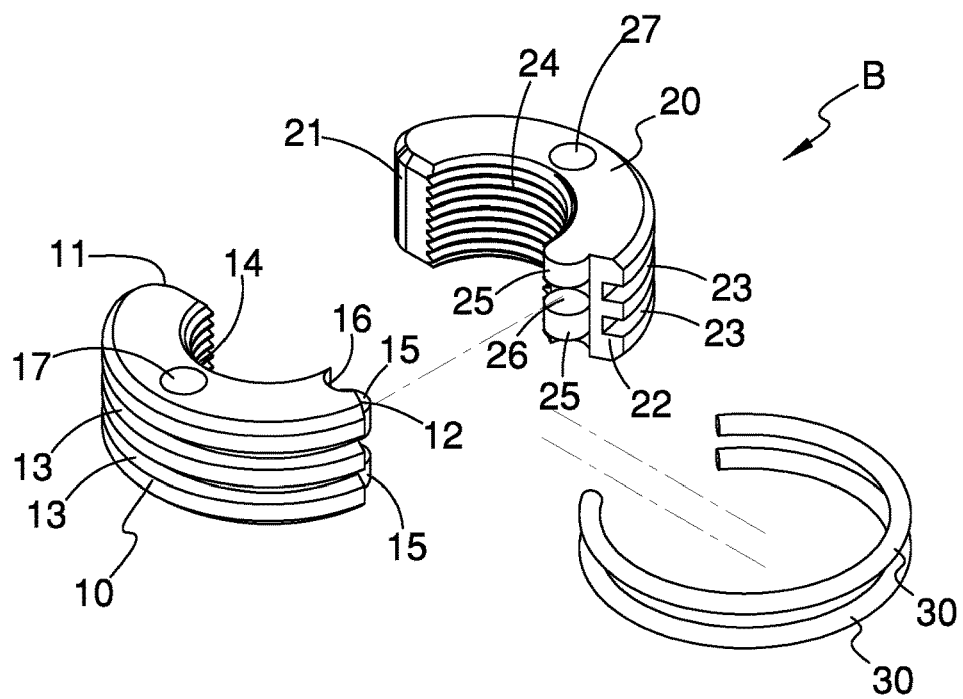
FIG. 8 is a perspective view showing the exploded components of a quick connect nut according to a third embodiment of the present invention.

With reference to FIG. 8, a difference of a quick connect nut of a third embodiment from that of the first embodiment comprises: two first peripheral grooves 13, two second peripheral grooves 23, and two flexible C-shaped retainers 30. Thereby, the clamping tool C is inserted into the first through hole 17 and the second through hole 27 so as to drive the first locking part 10 and the second locking part 20 to expand outwardly, as illustrated in FIG. 9.

Referring to FIGS. 10-13, a quick connect nut of a fourth embodiment further comprises a driving sleeve D, wherein the driving sleeve D is hexagonal, and the driving sleeve D includes an accommodation cavity D1 being circular, defined in a bottom thereof, and configured to house a body B, wherein the accommodation cavity D1 has a projection D2 formed on an inner wall thereof so as to retain with a cutout B1 of the body B. The driving sleeve D includes an aperture D3 formed in a top thereof, communicating with the accommodation cavity D1, and configured to accommodate the threaded rod A. Thereby, after the body B clamps the threaded rod. A and fits with the driving sleeve D, a wrench E or other clamping tools clamp and rotate the driving sleeve D so that the driving sleeve D actuates the body B to rotate by retaining the projection D with the cutout B1, and the driving sleeve D limits the body B firmly. The driving sleeve D is in any one of a square shape, a polygon shape, a star shape, and a flower shape.

A difference of a quick connect nut of a fifth embodiment from that of the fourth embodiment comprises: a first locking part 10 and a second locking part 20 connecting together in a hexagon shape, an accommodation cavity D1 of a fitting sleeve D being hexagonal so that the fitting sleeve D drives the body B directly without using the projection D2. Preferably, the first locking part 10 and the second locking part 20 lock together in a hexagon shape, a polygon shape, a star shape, or a flow shape.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A quick connect nut comprising a body connecting with and removing from a threaded rod, and the body including:

a first locking part including a first forcing face formed on a first end of the first locking part, a first tilted face formed on a second end of the first locking part, a first peripheral groove defined on an arcuately outer wall of the first locking part and communicating with the first tilted face, and a first semicircular orifice defined on an arcuately inner wall of the first locking part, wherein the first semicircular orifice has first inner threads formed therein, the first locking part further includes at least one first protrusion formed in a circle shape and located adjacent to the first tilted face, and the first locking part further includes at least one first arcuate notch spaced by the at least one first protrusion;

a second locking part including a second forcing face formed on a first end of the second locking part, a second tilted face formed on a second end of the second locking part, a second peripheral groove defined on an arcuately outer wall of the second locking part and communicating with the second tilted face, and a second semicircular orifice defined on an arcuately inner wall of the second locking part, wherein the second semicircular orifice has second inner threads formed therein, the second locking part further includes at least one second protrusion formed in a circle shape and located adjacent to the second tilted face, wherein the at least one second protrusion rotatably retains in the at least one first arcuate notch, and the second locking part further includes at least one second arcuate notch spaced by the at least one second protrusion and accommodating the at least one first protrusion, hence the first locking part and the second locking part lock with or release from each other;

wherein when the first locking part locks with the second locking part, a width of an expanding opening between the first locking part and the second locking part is more than an outer diameter of the threaded rod;

wherein the first and second locking parts further include a first through hole and a second through hole formed thereon, hence a clamping tool C is inserted into the first through hole and the second through hole so as to drive the first locking part and the second locking part to expand outwardly; and a flexible C-shaped retainer retained in the first peripheral groove and the second peripheral groove so as to lock the first locking part with the second locking part.

2. The quick connect nut as claimed in claim 1 further comprising a driving sleeve which is hexagonal, and the driving sleeve includes an accommodation cavity defined in a bottom thereof and configured to house a body, and the driving sleeve includes an aperture formed in a top thereof, communicating with the accommodation cavity, and configured to accommodate the threaded rod.

3. The quick connect nut as claimed in claim 2, wherein the first locking part is semicircular, and the second locking part is semicircular; when the first locking part locks with the second locking part to form the body in a circle shape, the first forcing face and the second forcing face couples together so as to define a cutout, the accommodation groove is circular and accommodates the body, wherein the accommodation cavity has a projection formed on an inner wall thereof so as to re au with the cutout of the body.

4. The quick connect nut as claimed in claim 2, wherein the first locking part and the second locking part connect together in a hexagon shape, and the accommodation cavity is hexagonal so as to house the body in a hexagon shape.

5. The quick connect nut as claimed in claim 1, wherein when the first and second locking parts lock together, an angle is defined between the first and second tilted faces.

6. The quick connect nut as claimed in claim 5, wherein the angle is within 50 degrees to 90 degrees.

7. The quick connect nut as claimed in claim 1, wherein a shape of the first locking part is identical to that of the second locking part.

8. The quick connect nut as claimed in claim 1, wherein the flexible C-shaped retainer is a curved C-shaped steel ring.

9. The quick connect nut as claimed in claim 1, wherein the flexible C-shaped retainer is a curved C-shaped steel sheet.

* * * * *